United States Patent [19]

Kelman et al.

[11] Patent Number: 5,520,758
[45] Date of Patent: May 28, 1996

[54] BUMPER PREFORM AND METHOD OF FORMING SAME

[75] Inventors: Josh Kelman, Dover, N.H.; Robert Hames, York, Me.

[73] Assignee: Davidson Textron Inc., Dover, N.H.

[21] Appl. No.: 372,169

[22] Filed: Jan. 12, 1995

Related U.S. Application Data

[60] Continuation of Ser. No. 91,329, Jul. 14, 1993, abandoned, which is a division of Ser. No. 875,304, Apr. 29, 1992, Pat. No. 5,248,551.

[51] Int. Cl.$^6$ ............................ B29B 11/06; B29B 11/16; B29C 70/30; B60R 19/03
[52] U.S. Cl. .......................... 156/62.2; 156/245; 156/267; 156/285; 264/112; 264/118; 264/121; 264/163; 264/258; 264/309; 264/517; 293/102; 293/120
[58] Field of Search ........................ 156/62.2, 62.4, 156/245, 267, 285; 264/112, 118, 121, 163, 258, 309, 517; 280/770; 293/102, 120–122; 425/81.1, 292; 428/74, 77–78, 236, 251, 273, 285, 286, 903

[56] References Cited

U.S. PATENT DOCUMENTS

| | | | |
|---|---|---|---|
| 2,577,205 | 12/1951 | Meyer et al. | 264/121 X |
| 2,929,436 | 3/1960 | Hampshire | 264/121 |
| 2,983,303 | 5/1961 | Voss | 264/121 X |
| 3,177,275 | 4/1965 | Brenner | 264/121 X |
| 4,477,243 | 10/1984 | Wallstén | 264/163 X |
| 5,182,065 | 1/1993 | Piotrowski et al. | 264/163 X |
| 5,294,394 | 3/1994 | Sakai et al. | 264/258 X |

FOREIGN PATENT DOCUMENTS

| | | | |
|---|---|---|---|
| 2833578 | 2/1980 | Germany | 425/292 |
| 3843535 | 6/1990 | Germany | 293/120 |
| 62-19430 | 1/1987 | Japan | 264/163 |
| 62-18431 | 1/1987 | Japan | 293/120 |
| 62-294530 | 12/1987 | Japan | 264/163 |
| 2231244 | 9/1990 | Japan | 293/120 |
| 4201753 | 7/1992 | Japan | 293/120 |

*Primary Examiner*—Adrienne C. Johnstone
*Attorney, Agent, or Firm*—Reising, Ethington, Barnard & Perry

[57] ABSTRACT

A process for producing a reinforced plastic motor vehicle bumper includes the steps of placing a woven roving (17) on a center section of a preform screen (10) that is retained by a vacuum draw from a suction fan (16). Chopped glass fibers (20) and a curable binder are sprayed onto the preform screen and woven roving. A second layer (22) of woven roving is placed onto the center section of chopped glass and first layer (17) of woven roving. Either the excess trim (39) is trimmed by a cutting die (50) before the preform is cured or the die is first cured and then the excess trim is trimmed by a cutter using a plastic base (35) in the screen that circumscribes the contoured section of the preform screen.

3 Claims, 2 Drawing Sheets

BUMPER PREFORM AND METHOD OF FORMING SAME

This is a continuation of application Ser. No. 08/091,329, filed on Jul. 14, 1993, now abandoned, which is a division of application Ser. No. 07/875,304, filed Apr. 29, 1992, now U.S. Pat. No. 5,248,551.

TECHNICAL FIELD

This invention relates generally to motor vehicle bumpers and bumper preforms and, more particularly, to an improved process for forming a glass fiber preform for a bumper that is trimmed before removal of the preform from a preform screen.

BACKGROUND OF THE INVENTION

Glass fibers have been commonly incorporated in thermoplastic molded objects and other cured plastics for added strength and durability. The glass fiber is introduced in a mold where resinous plastic is then injected such that the glass fibers become imbedded into the final formed object. It has been found advantageous to form a preform of the final object out of glass fibers and place the preform into the mold. The glass fibers are often chopped and blown onto a preform screen. Immediately following the fiber placement, a binder agent is sprayed on and allowed to cure which sets the fibers in place.

Conventional preforms for reinforced motor vehicle bumpers introduce glass fibers throughout the part in a uniform manner. The preforms are made by thermoforming rolled goods such as Fabmat (TM) or by directed fiber spray-up.

The known processes do not use layers of glass in the most efficient manner. The uniform distribution of woven roving or chopped glass fiber leads to inherent inefficiencies. Bumper areas of lowest stress have the same amount and same type of glass fiber as the highest stress areas. Furthermore, no provision is made for the removal of waste edge trimmings from the preform before the preform is removed from the screen for rendering an easier removal of the preform.

What is needed is a bumper preform that has higher glass levels and glass fabric in higher stress regions of the final object and a process for manufacturing such a preform.

SUMMARY OF THE DISCLOSURE

In accordance with one aspect of the invention a fibrous preform for a motor vehicle bumper has a layered center section. The center section has a center layer of chopped glass fibers bound by cured binder laminated between two layers of glass fabric. The fabric is bound to the chopped glass fibers by the cured binder to form a sandwiched laminate. The bumper preform has two end sections that are formed from chopped glass fibers and cured binder. Preferably, the center section has two laterally extending top and bottom flanges that are formed from chopped glass fibers and cured binder. The end sections and flanges are integrally formed with the laminated center section. It is assumed that the center section of the part experiences the highest stresses, so this section is composed of the chopped glass/woven roving sandwich. For bumpers or other parts with different stress geometries, the preform design can be changed accordingly.

In accordance with another aspect of the invention, a first layer of glass fabric is placed on a center section of a contoured preform screen that has a vacuum draw therethrough. Chopped glass fibers and curable binder are then sprayed onto the entire contoured section of the preform over the glass fabric. A second layer of glass fabric is then placed over the deposited chopped glass fibers in the central section of the preform screen.

In one embodiment, the preform screen plenum has a hard plastic cutting pad mounted therein that is aligned below the trim line of the preform. After the preform is cured but before it is removed from the preform screen, a cutter, such as a rotary cutter, cuts the excess trim on the cutting pad to trim the preform to its intended shape.

In another embodiment, the preform screen has a periphery section that has considerable draft. Any excess trim on the periphery is cut before curing of the preform by a cutting die. The cutting die is preferably mounted to a second screen that compacts the uncured preform from any excess loft. The preform is cured while both screens are in contact with the preform.

BRIEF DESCRIPTION OF THE DRAWINGS

Reference is now made to the accompanying drawings in which.

DETAILED DESCRIPTION OF THE PREFERRED EMBODIMENTS

Figure 1:
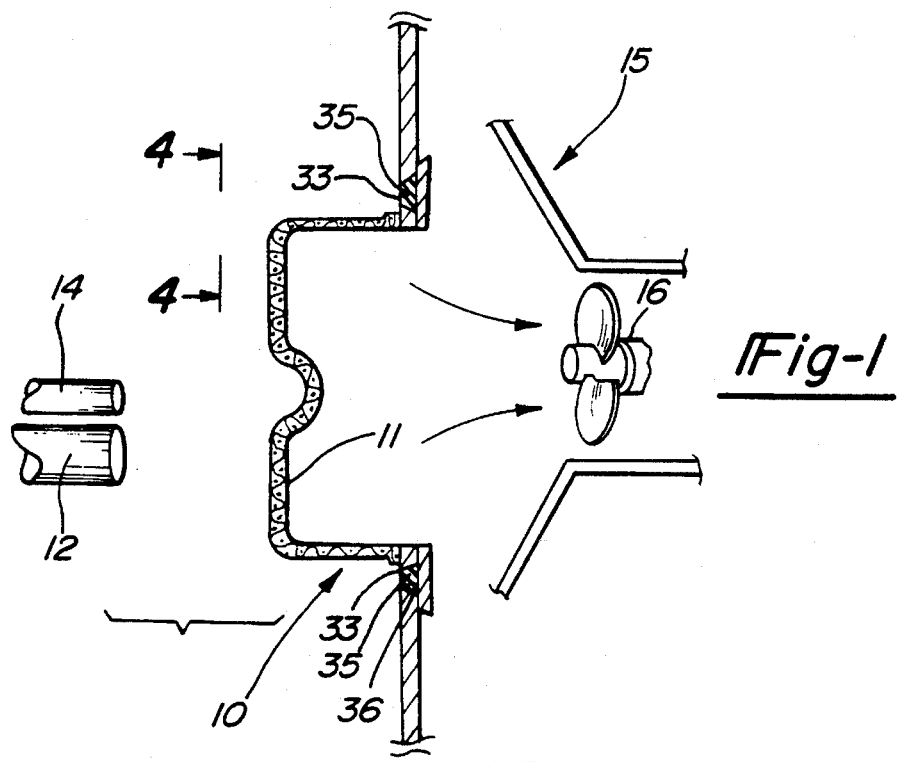
FIG. 1 is a side elevational, fragmentary, and partially segmented view of a fiber spray-up apparatus used in accordance with the invention.

Reference now is made to FIG. 1 which generally illustrates a preform screen 10, in proximity to a glass fiber nozzle 12 and a binder nozzle 14. The preform screen has the appropriate shape for producing a preform 25 for a motor vehicle bumper. The screen is mounted onto an appropriate platform 15 which may have a suction fan 16 operably connected thereto to produce a vacuum draw through the screen 10. The glass fiber nozzle 12 blows chopped glass fibers onto the screen and the binder nozzle 14 sprays curable binder onto the chopped glass. Commercially available thermoset liquid binder is suitable.

Figure 2:
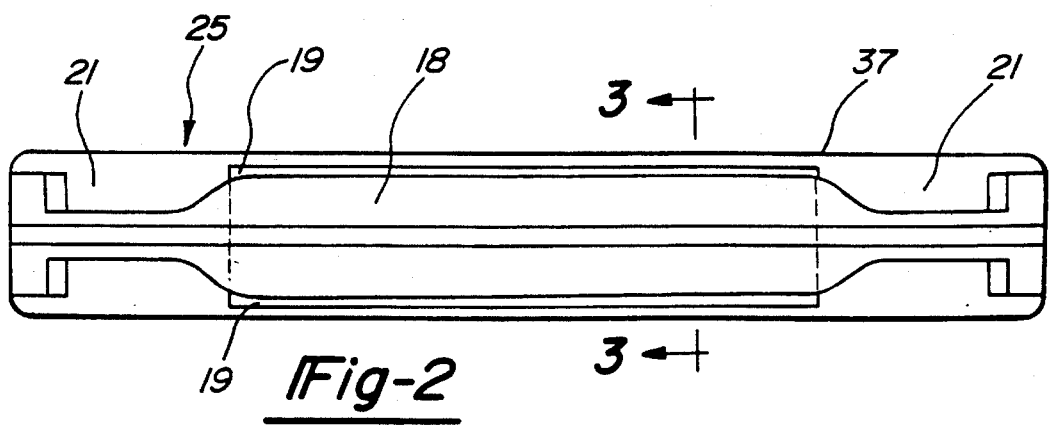
FIG. 2 is a plan view of the preform screen and preform illustrated in FIG. 1.
Figure 3:
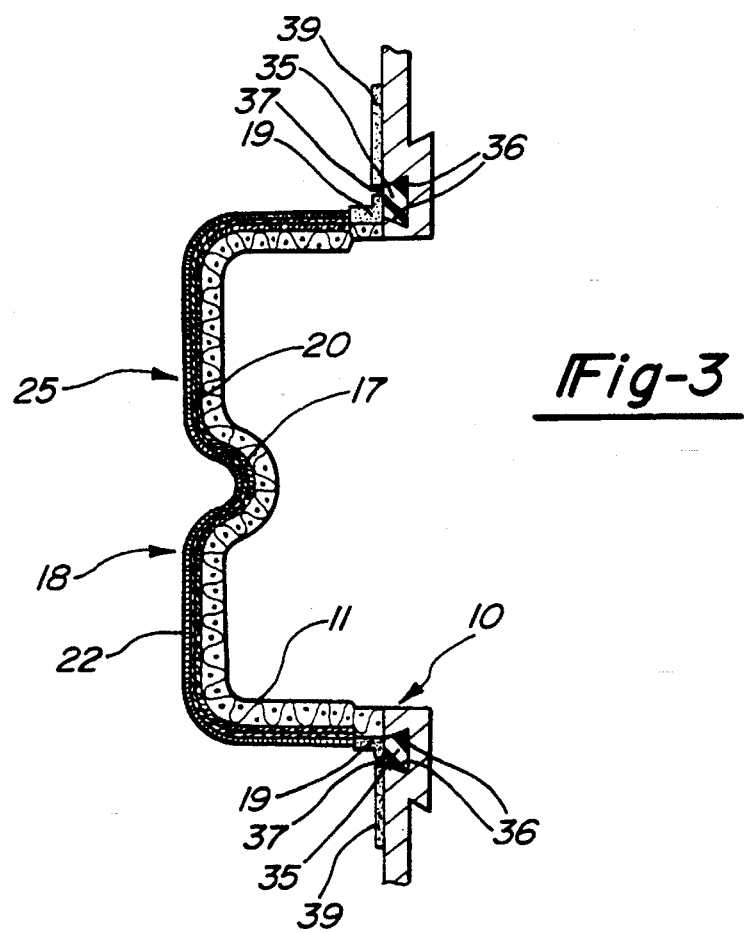
FIG. 3 is a view similar to FIG. 1 illustrating a cross-section of the center section of the bumper preform on the screen taken along lines 3—3 shown in FIG. 2.

A center section 18 of the bumper preform screen 10 is first layered with a glass fabric 17 as shown in FIG. 3. The glass fabric may be a woven roving or a glass knit. Chopped glass fibers 20 and binder are then applied to the center section 18 as well as the flange section 19, and end sections 21. The glass fibers used may be chopped from a commercially available roving such as one sold under the brand name PPG-5542. The chopped glass fibers may be chopped to between 1" and 4" in length depending on the application. A second layer 22 of woven roving is then applied to the center section 18 over the glass fiber 20 and binder. The assembled preform 25 as shown in FIGS. 2 and 3 is then cured conventionally. The vacuum draw by suction fan 16 retains the preform 25 on the screen until it is cured.

The formed preform 25 has a laminated center section 18. A layer of cured binder and chopped glass fiber 20 is interposed between the two layers 17 and 22 of glass fabric. The flanges 30 extending from the center section 18 and the two end sections 21 of the bumper preform 25 are composed of chopped glass fibers and cured binder that is integrally formed with the sandwiched center section 18.

Figure 4:
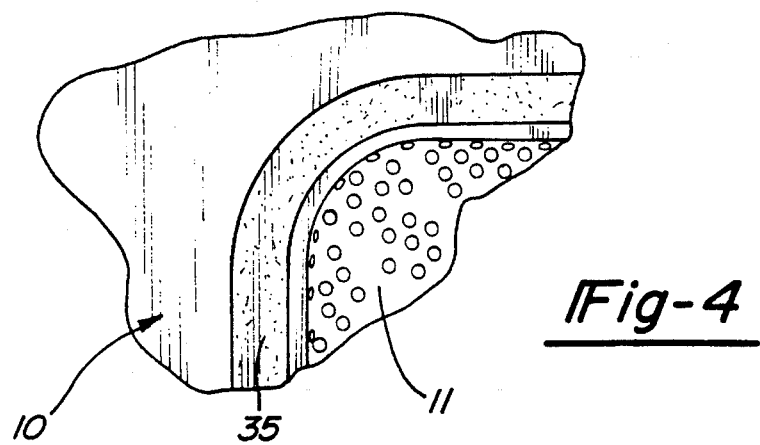
FIG. 4 is a fragmentary view of the preform screen taken along lines 4—4 shown in FIG. 1.

The preform screen 10 may have a hard plastic insert ring 35 circumscribing the contoured preform section 11 of screen 10 as illustrated in FIGS. 1 and 4. The hard plastic ring 35 is imbedded into the screen 10 with a reverse v-groove 36. The ring 35 forms a cutting seat i.e. cutting surface 33 for a rotary cutter to quickly trim the preform about its periphery 37 while it is still on the screen 10 after curing. The cutting of the excess edge trimmings 39 about the desired preform eases removal of the preform bumper from the screen 10.

Figure 5:
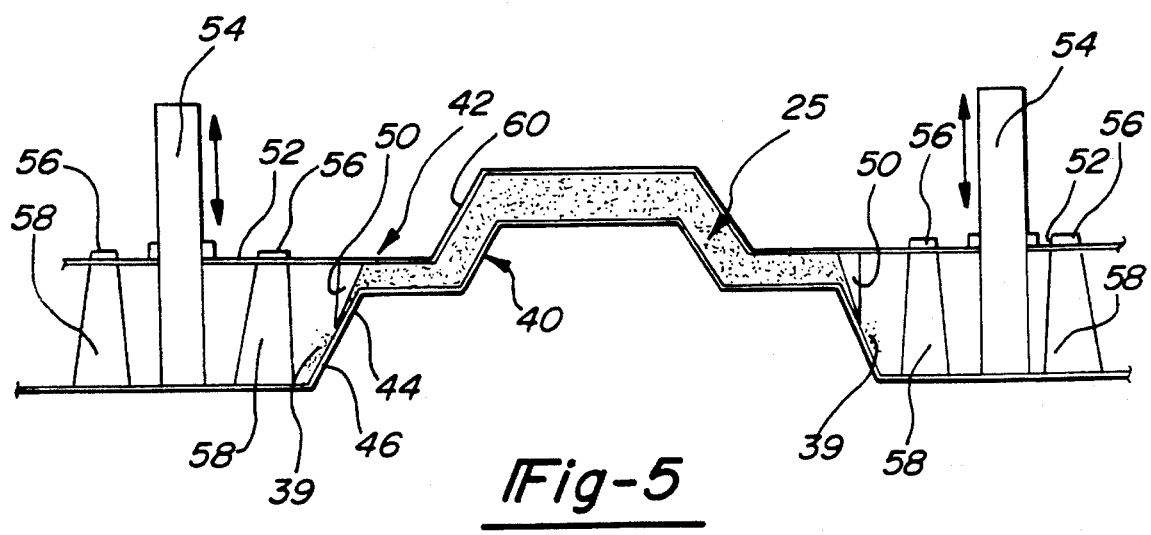
FIG. 5 is a schematic side elevational view illustrating an alternate embodiment in accordance with the invention.

Alternately, the secondary operation of trimming the preform may be eliminated by use of a edge die 42 with a preform screen 40 as illustrated in FIG. 5. The preform screen 40 has the appropriate contour within the perimeter area 44. The screen 40 has a perimeter wall 46 of solid metal with a considerable draft between 5–15 degrees.

The edge die 42 has a cutting die 50 mounted on a movable frame 52 that can move toward and away from screen 40. The frame 52 may be mounted onto guide pins 54 to help the frame move. The frame may have closure bearing pads 56 that abut stops 58 mounted about screen 40. Within the perimeter of cutting die 50, the frame mounts a second foraminous screen 60 contoured to the specified outer dimensions of the preform 25. The second screen 60 moves with frame 52. Both the cutting die 50 and second screen 60 are coaxially mounted with respect to preform screen 40 about axis 61.

In operation, the frame 52 is positioned away from the screen 10 and the preform 25 is built in the appropriate fashion preferably with the combined use of woven roving and directed blown chopped fiber glass and binder. After the preform 25 is formed, but before the binder cures, the frame 52 is moved toward the screen 10 such that the second screen 60 compacts the newly formed preform 25 between the first screen 40 and second screen 60 to eliminate any excess loft. This creates a stiff preform which aids in removal from the screen and eases handling. The cutting die 50 is used to shear off excess edge trimmings 39 of the uncured preform 25. The preform is then cured, with both screens 40 and 60 in place after which the frame 52 is moved away from the screen 40 and the preform is removed.

In this manner, the preform 25 is both compacted and trimmed before curing such that upon curing, a compacted and trimmed preform is produced. This process is desired for the use in manufacturing preforms for motor vehicle bumpers.

In this fashion, a novel and advantageous preform bumper is produces by process that reduces loft and cuts edge trimmings before removal of the preform from the preform screen, and increases the efficient use of woven roving in the motor vehicle bumper.

Other variations and modifications are possible without departing from the scope and spirit of the present invention as defined in the appended claims.

The embodiments in which an exclusive property and privilege is claimed are defined as follows:

1. A process of forming a fibrous preform for a motor vehicle bumper, said process comprising the steps of:

providing a preform screen having the shape of a motor vehicle bumper preform including a center section and an end section on either side of said center section;

providing a first layer of glass fabric having the shape of the center section of the preform screen and conforming the first layer of glass fabric to lay flat only on the center section;

directing chopped fibers and binder onto the first layer of glass fabric previously located only on the center section of the screen and directly on the end sections of the screen;

providing a second layer of glass fabric having the shape of the center section of the preform screen and conforming the second layer of glass fabric against the chopped fibers and binder previously directed onto the first layer of glass fabric; and curing the binder to form a motor vehicle preform that has a sandwiched laminated center section and ends made from chopped fibers.

2. The process defined in claim 1, further comprising providing a cutting pad on the periphery of said screen with a shape corresponding to the perimeter of a motor vehicle bumper preform and to underlie edge trim at the perimeter of a motor vehicle bumper preform;

providing a second screen for holding said first and second layers of glass fabric together and to compress said chopped fibers and binder at the end sections; and prior to curing of the binder cutting the edge trim from said preform by moving the cutter with respect to the cutting pad.

3. The process defined in claim 2, further comprising providing a cutting die and moving said cutting die coaxially of the cutting pad for cutting the edge trim from said preform.

* * * * *